(12) United States Patent
Chen (10) Patent No.: US 12,464,443 B2
(45) Date of Patent: Nov. 4, 2025

(54) METHOD FOR ADAPTIVELY SHORTENING COMMUNICATION LATENCY IN THE COMMUNICATION PROCEDURE AND COMMUNICATION APPARATUS UTILIZING THE SAME

(71) Applicant: MEDIATEK INC., Hsin-Chu (TW)

(72) Inventor: Chi-Hsien Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 422 days.

(21) Appl. No.: 18/088,633

(22) Filed: Dec. 26, 2022

(65) Prior Publication Data

US 2024/0214912 A1 Jun. 27, 2024

(51) Int. Cl.
*H04W 48/16* (2009.01)
*H04L 5/00* (2006.01)

(52) U.S. Cl.
CPC ........... *H04W 48/16* (2013.01); *H04L 5/0055* (2013.01)

(58) Field of Classification Search
CPC .............................. H04W 48/16; H04L 5/0055
USPC ......................................................... 370/329
See application file for complete search history.

(56) References Cited

U.S. PATENT DOCUMENTS

| | | | | |
|---|---|---|---|---|
| 2007/0297352 A1* | 12/2007 | Jabri | ................... | H04L 65/1101 370/329 |
| 2015/0195216 A1* | 7/2015 | Di Pietro | ............... | G06N 20/00 370/252 |
| 2015/0334675 A1* | 11/2015 | Cho | ....................... | H04W 24/02 455/435.1 |

FOREIGN PATENT DOCUMENTS

| | | |
|---|---|---|
| CN | 115299167 A | 11/2022 |
| TW | 200952383 A1 | 12/2009 |
| TW | 202245532 A | 11/2022 |

OTHER PUBLICATIONS

Asustek, "Discussion on TP for blind Msg3 retransmission", 3GPP TSG-RAN WG2 Meeting #118 electronic, R2-2205135, May 9, 2022, https://www.3gpp.org/ftp/TSG_RAN/WG2_RL2/TSGR2_118-e/docs/R2-2205135.zip, May 9, 2022.

* cited by examiner

*Primary Examiner* — Chuck Huynh
(74) *Attorney, Agent, or Firm* — Winston Hsu (57) ABSTRACT

A method for adaptively shortening communication latency in the communication procedure includes: initiating a communication procedure to communicate with a network device by transmitting a predetermined message via a radio transceiver of a communication apparatus; determining an action indicator regarding transmission of the predetermined message according to information regarding network environment in which the predetermined message is transmitted; determining a follow-up action to be performed after the transmission of the predetermined message based on the action indicator; and performing the follow-up action.

20 Claims, 6 Drawing Sheets

METHOD FOR ADAPTIVELY SHORTENING COMMUNICATION LATENCY IN THE COMMUNICATION PROCEDURE AND COMMUNICATION APPARATUS UTILIZING THE SAME

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Long Term Evolution (LTE) is a set of enhancements to the Universal Mobile Telecommunications System (UMTS) mobile standard promulgated by Third Generation Partnership Project (3GPP). 5G New Radio (NR) is a new Radio Access Technology (RAT) developed by 3GPP for the 5G (fifth generation) mobile network.

During the technology developing in the field of wireless communication, how to improve user experience is always an important topic worthy to be concerned. Usually, great communication latency brings bad experience to the user. However, the communication latency in some important connection establishment procedure may still be more than several seconds. For example, there may be 15 seconds communication latency required for retransmission of a registration request message when a communication apparatus is trying to register with the network, which is an undesired result and severely downgrades the user experience.

In view of this, solutions for intelligently and/or adaptively shortening communication latency in the communication procedure performed by the communication apparatus to improve user experience are highly required.

SUMMARY

According to an embodiment of the invention, a communication apparatus comprises a radio transceiver configured to transmit or receive wireless signals to or from a network device in a wireless network and a processor coupled to the radio transceiver and configured to perform operations comprising: initiating a communication procedure to communicate with the network device by transmitting a predetermined message via the radio transceiver; determining an action indicator regarding transmission of the predetermined message according to information regarding network environment in which the predetermined message is transmitted; determining a follow-up action to be performed after the transmission of the predetermined message based on the action indicator; and performing the follow-up action.

According to an embodiment of the invention, a method for adaptively shortening communication latency in the communication procedure comprises: initiating a communication procedure to communicate with a network device by transmitting a predetermined message via a radio transceiver of a communication apparatus; determining an action indicator regarding transmission of the predetermined message according to information regarding network environment in which the predetermined message is transmitted; determining a follow-up action to be performed after the transmission of the predetermined message based on the action indicator; and performing the follow-up action.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
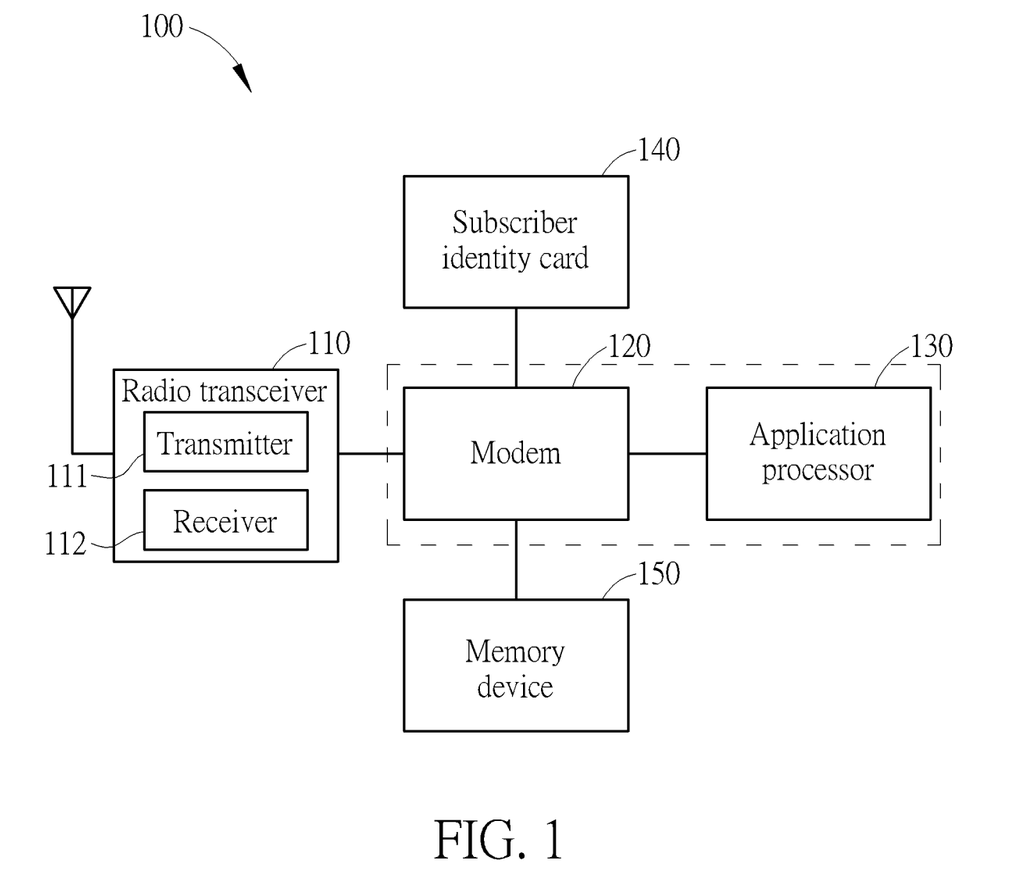
FIG. 1 shows an exemplary block diagram of a communication apparatus according to an embodiment of the invention.

FIG. 1 shows an exemplary block diagram of a communication apparatus according to an embodiment of the invention. The communication apparatus 100 may be a portable electronic device, such as a Mobile Station (MS, which may be interchangeably referred to as User Equipment (UE)). The communication apparatus 100 may comprise at least an antenna module comprising at least one antenna, a radio transceiver 110, a modem 120, an application processor 130, a subscriber identity card 140, and a memory device 150. The radio transceiver 110 may be configured to transmit and/or receive wireless signals to and/or from a network device in a wireless network via the antenna module, so as to communicate with the network device via a communication link established between the communication apparatus 100 and the network device. The radio transceiver 110 may comprise a receiver 112 configured to receive wireless signals from the air interface and a transmitter 111 configured to transmit wireless signals to the air interface, and the radio transceiver 110 may be further configured to perform RF signal processing. For example, the receiver 112 may convert the received signals into intermediate frequency (IF) or baseband signals to be processed, or transmitter 111 may receive the IF or baseband signals from the modem 120 and convert the received signals into wireless signals to be transmitted to the network device in the wireless network or in an access network (e. g. a cellular network or a wireless local access network). According to an embodiment of the invention, the network device may be a cell, a node B, an evolved node B (eNB), a g node B (gNB), a base station, a Mobility Management Entity (MME), an Access and Mobility Management Function (AMF) device, an access point (AP), etc., at the network side and communicating with the communication apparatus 100 by the wireless signals via the communication link.

The transmitter 111 and the receiver 112 of the radio transceiver 110 may comprise a plurality of hardware devices to perform radio frequency (RF) conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communication apparatus 100 and run application programs installed in the communication apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communication apparatus may further comprise some peripheral devices not shown in FIG. 1. In another example, in some embodiments of the invention, the communication apparatus may further comprise a central controller coupled to the modem 120 and the application processor 130. Therefore, the invention should not be limited to what is shown in FIG. 1.

In some embodiments of the invention, the communication apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communication apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communication apparatuses comprising multiple radio transceivers and/or multiple antenna modules for supporting multi-RAT wireless communications without departing from the scope and spirit of this invention. Therefore, in some embodiments of the invention, the communication apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be virtual cards, such as individual identifiers, numbers, addresses, or the like which are burned in the internal memory device of the corresponding modem and are capable of identifying the communication apparatus. Therefore, the invention should not be limited to what is shown in the figures.

It should be further noted that in some embodiments of the invention, the communication apparatus may further support multiple IMSIs.

Figure 2:
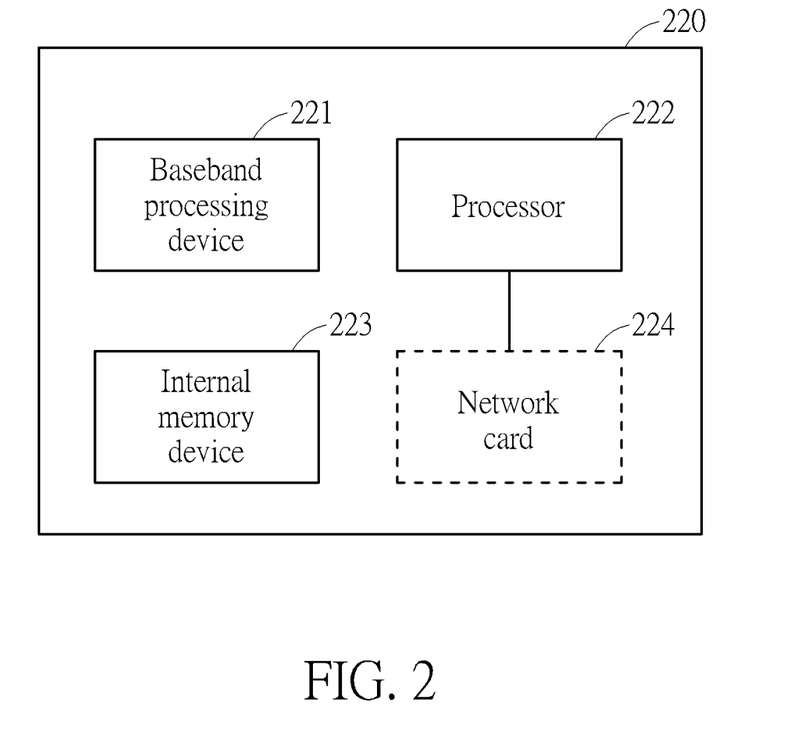
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communication apparatus. It should be noted that, although the network card 224 shown in FIG. 2 is configured inside of the modem, the invention should not be limited thereto. In some embodiments of the invention, the communication apparatus may also comprise a network card configured outside of the modem, or the communication apparatus may also be coupled to an external network card for providing Internet access services. In some embodiments of the invention, the network card 224 may be a virtual network card, instead of a tangible card, that is created by the operating system of the communication apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RAT operations. Therefore, the invention should not be limited to what is shown in FIG. 2.

Figure 3:
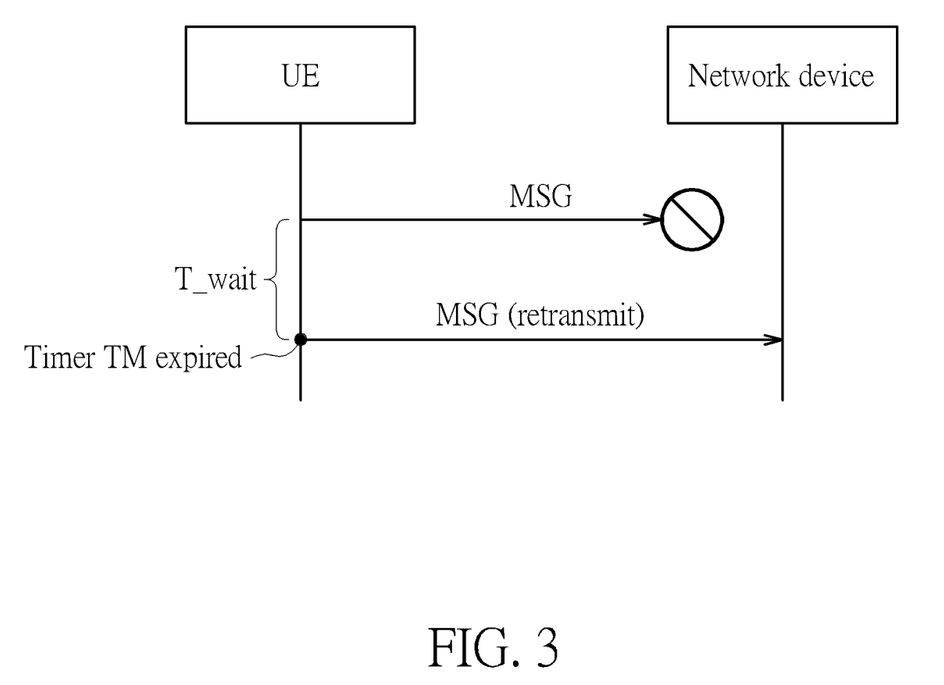
FIG. 3 illustrates an exemplary message flow for transmitting a predetermined message to the network device.

FIG. 3 shows an exemplary message flow for transmitting a predetermined message to the network device, which illustrates the behavior specified by the 3GPP standards. The UE may transmit a predetermined message MSG to the network device to initiate a communication procedure. Responsive of transmission of the predetermined message MSG, the UE may start a timer TM (e.g. a retransmission timer) for counting a predetermined time period T_wait. At least for some messages, the timer TM (the retransmission timer) and the length of the predetermined time period T_wait are well defined by the 3GPP standards.

As specified in the 3GPP standards, for the messages having well-defined retransmission timer, the UE should not re-transmit same message until the timer expired after sending previous one, so as to avoid network overloading. Therefore, if the predetermined message MSG is one of the messages having a well-defined retransmission timer as specified in the 3GPP standards, the UE is configured to wait for a response message from the network device during the predetermined time period T_wait and is unable to re-transmit same message MSG until the timer TM expired.

However, such control mechanism sometimes generates long communication latency and brings bad experience to the user.

To solve this problem, methods for adaptively and intelligently shortening communication latency in a communication procedure to improve user experience are provided.

Figure 4:
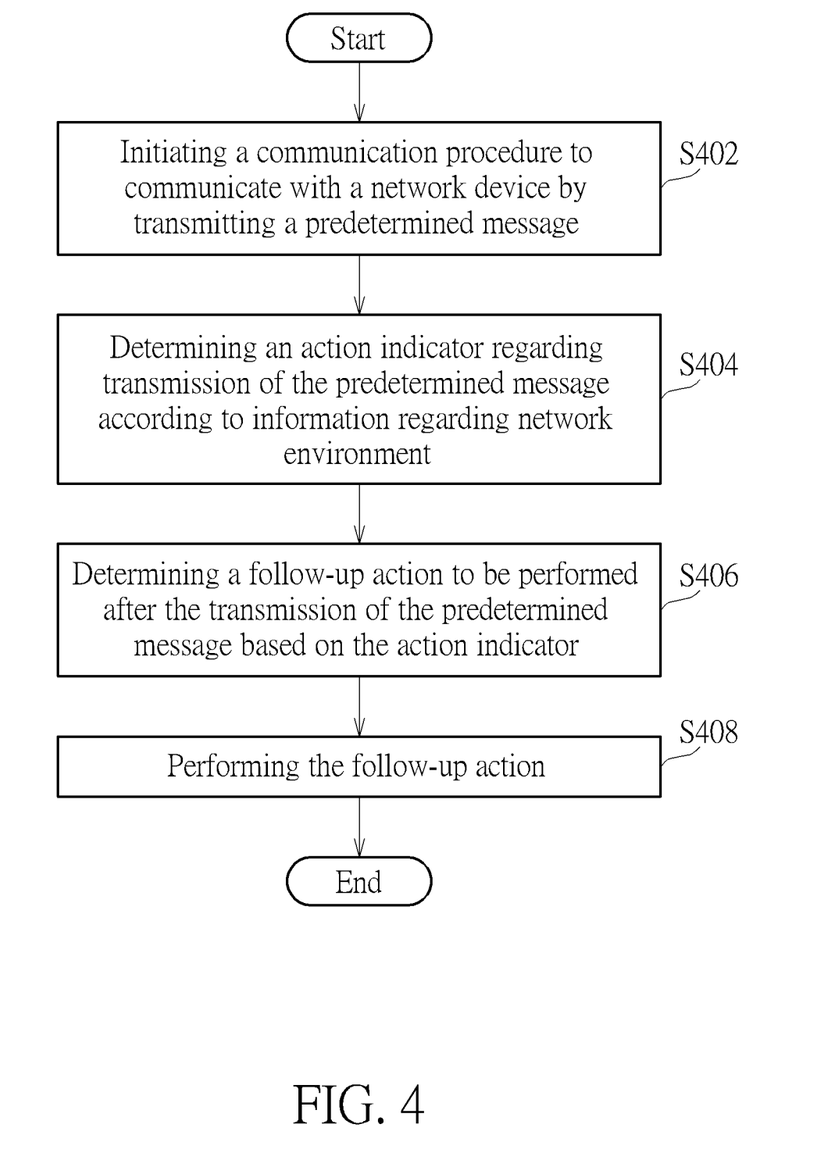
FIG. 4 shows an exemplary flow chart of a method for adaptively shortening communication latency in the communication procedure according to an embodiment of the invention.

FIG. 4 shows an exemplary flow chart of a method for adaptively shortening communication latency in the communication procedure according to an embodiment of the invention. The method may be performed by the communication apparatus (e.g. the processor 222 of the communication apparatus 100) and may comprise the following steps:

Step S402: Initiating a communication procedure to communicate with a network device by transmitting a predetermined message via the radio transceiver 110.

Step S404: Determining an action indicator regarding transmission of the predetermined message according to information regarding network environment in which the predetermined message is transmitted. In the embodiments of the invention, the action indicator may be a direct or indirect indication of a follow-up action after transmitting the predetermined message.

Step S406: Determining a follow-up action to be performed after the transmission of the predetermined message based on the action indicator.

Step S408: Performing the follow-up action.

According to an embodiment of the invention, the predetermined message may be a non-access stratum (NAS) message and responsive of the transmission of the predetermined message, the processor may be further configured to start a timer, such as the aforementioned timer TM, for counting a predetermined time period.

In an embodiment of the invention, the action indicator may be a predicted possibility of the predetermined message being successfully received by the network device. When predetermined message is successfully received by the network device, the network device is configured to transmit a response message to the communication apparatus for responding to the predetermined message.

In another embodiment of the invention, the action indicator may be a predicted possibility of a response message transmitted by the network device for responding to the predetermined message being successfully received by the communication apparatus 100.

According to an embodiment of the invention, the processor 222 is configured to determine the action indicator regarding transmission of the predetermined message with a machine learning based engine or an artificial intelligence (AI) engine. As an example, the processor 222 is configured to predict the success rate or the success possibility regarding the transmission of the predetermined message.

To be more specific, the processor 222 may keep collecting the information regarding network environment, as an example, before, during or after transmission of the predetermined message, and keep learning a relationship between a result of signal transmission and the network environment. The result of signal transmission may be selected from a group comprising a success or a failure. As an example, if the communication apparatus 100 does not receive a response message from the network device for responding to a transmitted message, the signal transmission result is fail, and the reason of transmission failure may be that the message cannot be successfully received by the network device or a response message transmitted by the network device for responding to the transmitted message cannot be successfully received by the communication apparatus 100. On the other hand, if the communication apparatus 100 is able to successfully receive a response message from the network device for responding to a transmitted message, the signal transmission result is successful.

With the knowledge of the relationship between the signal transmission results with respect to different network environments, the processor 222 may determine the action indicator (e.g. predict the success rate or the success possibility regarding the transmission of the predetermined message) according to the information regarding network environment in which the predetermined message is transmitted.

In an embodiment of the invention, the information regarding network environment may be, for example but not limited to, the Radio Frequency (RF) signal information (such as the Reference Symbol Received Power (RSRP), the Block Error Ratio (BLER) and the Signal to Noise Ratio (SNR)), the channel estimation result, some other measurement results, or the likes.

Figure 5:
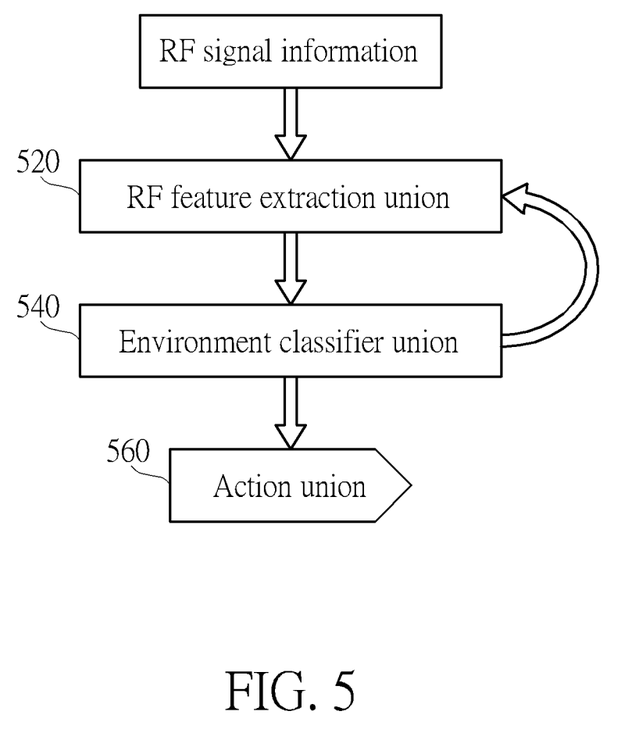
FIG. 5 shows an exemplary framework implemented by a machine learning based engine according to an embodiment of the invention.

FIG. 5 shows an exemplary framework implemented by a machine learning based engine according to an embodiment of the invention. The machine learning based engine may comprise a RF feature extraction union 520, an environment classifier union 540 and an action union 560. The RF signal information may be provided as an input of RF feature extraction union 520 to extract the RF feature of the network environment. The extracted RF feature of the network environment may be provided as an input of the environment classifier union 540 to classify the network environment. As an example, the classification may be performed by classifying the type of the network environment according to the extracted RF feature. The classified network environment may be provided as an input of the action union 560 to determine a follow-up action to be performed. Note that in some embodiments of the invention, some UE information may also be provided as another input of the action union 560 to determine the follow-up action, and the UE information may be a strategy for determining the follow-up action based on the information regarding network environment.

According to an embodiment of the invention, the machine learning algorithm performed by the machine learning based engine may use any appropriate machine learning algorithm. In some examples, the machine learning algorithm is a supervised learning algorithm, unsupervised learning algorithm, a reinforcement learning algorithm, a deep learning algorithm, an artificial neural network algorithm, an online algorithm, or any other suitable type of machine learning algorithm.

According to an embodiment of the invention, when the action indicator determined by the processor 222 or the action union 560 indicates that the predicted possibility of the predetermined message being successfully transmitted to the network device (including that the predetermined message is successfully received by the network device and a response message transmitted by the network device for responding to the predetermined message is successfully received) is higher than a first threshold (e.g. 80%100%), when performing the follow-up action in step S408, the processor may be configured to perform operations comprising: waiting for a response message transmitted by the network device for responding to the predetermined message during the predetermined time period, such as the aforementioned predetermined time period T_wait counted by the aforementioned timer TM. Note that even if the response message has not been received yet, the processor 222 is configured not to retransmit the predetermined message before the timer expired.

According to an embodiment of the invention, when the action indicator determined by the processor 222 or the action union 560 indicates that the predicted possibility of the predetermined message being successfully transmitted to the network device is lower than the first threshold but higher than a second threshold (e.g. 60%~<80%), when performing the follow-up action in step S408, the processor may be configured to perform operations comprising: shortening a length of the predetermined time period, such as the aforementioned predetermined time period T_wait counted by the aforementioned timer TM; and waiting for a response message transmitted by the network device for responding to the predetermined message during the predetermined time period which has a shortened length. As an example, the length of the predetermined time period T_wait may be shortened to half of the original length of the predetermined time period T_wait as defined by the 3GPP standard. Note that the processor 222 is configured not to retransmit the predetermined message before the timer expired (note that the timer is now configured to count the predetermined time period with a shortened length). When it is determined that no response message has been received during the predetermined time period with a shortened length, the processor 222 is configured to retransmit the predetermined message to the network device via the radio transceiver (e.g. retransmit after the timer expired). In this manner, the retransmission of the predetermined message is performed earlier than the standard behavior specified by the 3GPP standards.

According to an embodiment of the invention, when the action indicator determined by the processor 222 or the action union 560 indicates that the predicted possibility of the predetermined message being successfully transmitted to the network device is lower than the second threshold but higher than a third threshold (e.g. 40%~<60%), when performing the follow-up action in step S408, the processor may be configured to perform operations comprising: shortening a length of the predetermined time period, such as the aforementioned predetermined time period T_wait counted by the aforementioned timer TM; and waiting for a response message transmitted by the network device for responding to the predetermined message during the predetermined time period which has a shortened length. As an example, the length of the predetermined time period T_wait may be shortened to a quarter of the original length of the predetermined time period T_wait as defined by the 3GPP standard. Note that the processor 222 is configured not to retransmit the predetermined message before the timer expired (note that the timer is now configured to count the predetermined time period with a shortened length). When it is determined that no response message has been received during the predetermined time period with a shortened length, the processor 222 is configured to retransmit the predetermined message to the network device via the radio transceiver (e.g. retransmit after the timer expired). In this manner, the retransmission of the predetermined message is performed earlier than the standard behavior specified by the 3GPP standards.

According to an embodiment of the invention, when the action indicator determined by the processor 222 or the action union 560 indicates that the predicted possibility of the predetermined message being successfully transmitted to the network device is lower than the third threshold but higher than a fourth threshold (e.g. 20%~<40%), when performing the follow-up action in step S408, the processor may be configured to perform operations comprising: stop the timer, such as the aforementioned timer TM; and retransmitting the predetermined message to the network device via the radio transceiver immediately. In this manner, the retransmission of the predetermined message is performed earlier than the standard behavior specified by the 3GPP standards.

According to an embodiment of the invention, when the action indicator determined by the processor 222 or the action union 560 indicates that the predicted possibility of the predetermined message being successfully transmitted to the network device is lower than the fourth threshold (e.g. 0%~<20%), when performing the follow-up action in step S408, the processor may be configured to perform operations comprising: stop the timer, such as the aforementioned timer TM; and aborting the communication procedure. Typically, the 3GPP standards may clearly define a predetermined number of times (e.g. 5 times) of retransmission for the messages. In the embodiment of the invention, when aborting the communication procedure, the number of times of retransmission of the predetermined message performed by the communication apparatus 100 is less than the predetermined number of times of retransmission defined by the 3GPP standards for the predetermined message. In this manner, the user does not feel long latency as standard behavior specified by the 3GPP standards.

Figure 6:
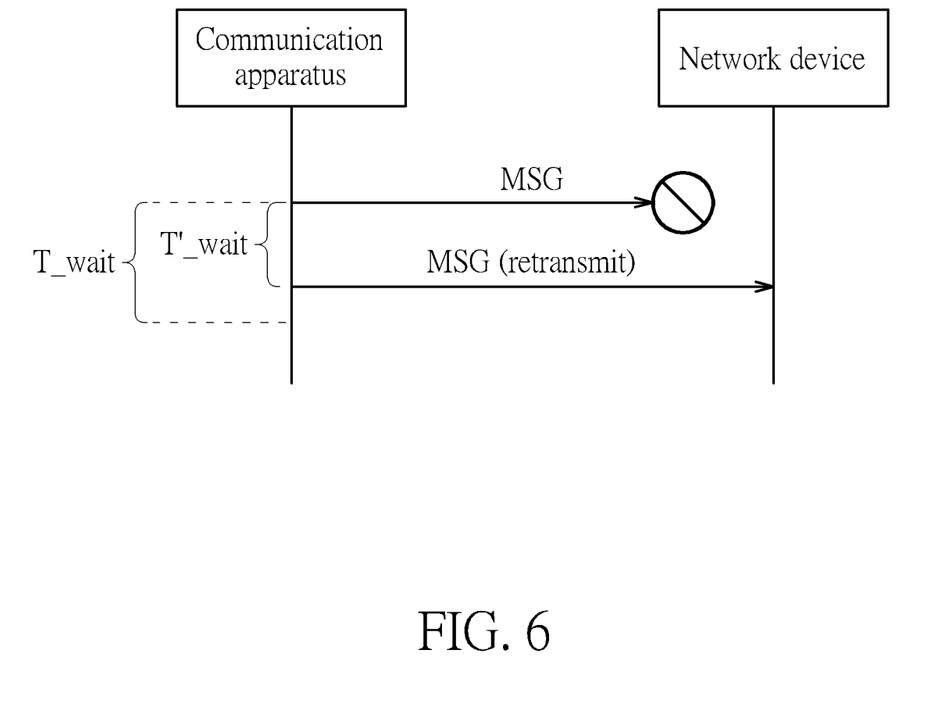
FIG. 6 illustrates an exemplary message flow for transmitting a predetermined message to the network device when applying the proposed method for adaptively shortening communication latency in the communication procedure according to an embodiment of the invention.

FIG. 6 illustrates an exemplary message flow for transmitting a predetermined message to the network device when applying the proposed method for adaptively shortening communication latency in the communication procedure according to an embodiment of the invention. The communication apparatus 100 may transmit the predetermined message MSG to the network device to initiate a communication procedure. Responsive of transmission of the predetermined message MSG, the communication apparatus 100 may start a timer TM for counting a predetermined time period T_wait as defined by the 3GPP standards, determine an action indicator regarding transmission of the predetermined message according to information regarding network environment in which the predetermined message is transmitted, determine a follow-up action to be performed after the transmission of the predetermined message based on the action indicator and performing the determined follow-up action. In this embodiment, the processor 222 of the communication apparatus 100 determines to shorten the length of the predetermined time period T_wait to be counted by the timer TM as the shortened time period T'_wait shown in FIG. 6, so that the communication apparatus 100 will retransmit the predetermined message MSG earlier as compared to the example flow shown in FIG. 3.

In the embodiments of the invention, by applying the proposed method for adaptively shortening communication latency in the communication procedure, the message retransmission may be performed earlier than behavior defined in 3GPP standards based on the knowledge of machine learning results, the successful rate of the communication procedure and the message retransmission may be increased accordingly, and the user experience may be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus, comprising:
    a radio transceiver, configured to transmit or receive wireless signals to or from a network device in a wireless network; and
    a processor, coupled to the radio transceiver and configured to perform operations comprising:
        initiating a communication procedure to communicate with the network device by transmitting a predetermined message via the radio transceiver;
        starting a timer for counting a predetermined time period, wherein the processor is configured to not retransmit the predetermined message before the predetermined time period expires;
        determining an action indicator regarding transmission of the predetermined message according to information regarding network environment in which the predetermined message is transmitted, wherein the action indicator is a predicted possibility of a message between the communication apparatus and the network being successfully received;
        determining a follow-up action to be performed after the transmission of the predetermined message based on the action indicator, comprising: comparing the action indicator with a plurality of thresholds; and
        performing the follow-up action according to the comparison result, wherein the follow-up action alters the predetermined time period according to the comparison result.

2. The communication apparatus of claim 1, wherein the action indicator is a predicted possibility of the predetermined message being successfully received by the network device.

3. The communication apparatus of claim 1, wherein the action indicator is a predicted possibility of a response message transmitted by the network device for responding to the predetermined message being successfully received.

4. The communication apparatus of claim 1, wherein the predetermined message is a non-access stratum (NAS) message.

5. The communication apparatus of claim 4, wherein when performing the follow-up action, the processor is further configured to perform operations comprising:
    waiting for a response message transmitted by the network device for responding to the predetermined message during the predetermined time period.

6. The communication apparatus of claim 1, wherein when the action indicator is between a first threshold and a third threshold according to the comparison result, when performing the follow-up action, the processor is further configured to perform operations comprising:
    shortening a length of the predetermined time period; and
    waiting for a response message transmitted by the network device for responding to the predetermined message during the predetermined time period which has a shortened length; and
    when no response message has been received during the predetermined time period, retransmitting the predetermined message to the network device via the radio transceiver.

7. The communication apparatus of claim 1, wherein when the action indicator is between a fourth threshold and the third threshold according to the comparison result, when performing the follow-up action, the processor is further configured to perform operations comprising:
    stopping the timer; and
    retransmitting the predetermined message to the network device via the radio transceiver immediately.

8. The communication apparatus of claim 1, wherein when the action indicator is below the fourth threshold according to the comparison result, when performing the follow-up action, the processor is further configured to perform operations comprising:
    stopping the timer; and
    aborting the communication procedure.
9. The communication apparatus of claim 1, wherein the processor is configured to perform the operation of determining the action indicator regarding transmission of the predetermined message with a machine learning based engine.
10. A method for adaptively shortening communication latency in the communication procedure, comprising:
    initiating a communication procedure to communicate with a network device by transmitting a predetermined message via a radio transceiver of a communication apparatus;
    starting a timer for counting a predetermined time period, wherein the processor is configured to not retransmit the predetermined message before the predetermined time period expires;
    determining an action indicator regarding transmission of the predetermined message according to information regarding network environment in which the predetermined message is transmitted, wherein the action indicator is a predicted possibility of a message between the communication apparatus and the network being successfully received;
    determining a follow-up action to be performed after the transmission of the predetermined message based on the action indicator, comprising: comparing the action indicator with a plurality of thresholds; and
    performing the follow-up action according to the comparison result, wherein the follow-up action alters the predetermined time period according to the comparison result.
11. The method of claim 10, further comprising:
    collecting the information regarding network environment; and
    keep learning a relationship between a result of signal transmission and the network environment,
    wherein the action indicator is determined with knowledge of the result of signal transmission and the network environment.
12. The method of claim 10, wherein the action indicator is a predicted possibility of the predetermined message being successfully received by the network device.
13. The method of claim 10 wherein the action indicator is a predicted possibility of a response message transmitted by the network device for responding to the predetermined message being successfully received by the communication apparatus.
14. The method of claim 10, wherein the predetermined message is a non-access stratum (NAS) message.
15. The method of claim 14, wherein step of performing the follow-up action further comprises:
    waiting for a response message transmitted by the network device for responding to the predetermined message during the predetermined time period.
16. The method of claim 10, wherein when the action indicator is between a first threshold and a third threshold according to the comparison result, the step of performing the follow-up action further comprises:
    shortening a length of the predetermined time period; and
    waiting for a response message transmitted by the network device for responding to the predetermined message during the predetermined time period which has a shortened length; and
    retransmitting the predetermined message to the network device via the radio transceiver after the predetermined time period which has a shortened length when no response message has been received during the predetermined time period.
17. The method of claim 10, wherein when the action indicator is between a fourth threshold and the third threshold according to the comparison result, the step of performing the follow-up action further comprises:
    stopping the timer; and
    retransmitting the predetermined message to the network device via the radio transceiver immediately.
18. The method of claim 10, wherein when the action indicator is below the fourth threshold according to the comparison result, the step of performing the follow-up action further comprises:
    stopping the timer; and
    aborting the communication procedure.
19. The communication apparatus of claim 6, wherein when the action indicator is between the first threshold and a second threshold greater than the third threshold, the predetermined time period is shortened to be half the predetermined time period, and when the action indicator is between the second threshold and the third threshold, the predetermined time period is shortened to be a quarter of the predetermined time period.
20. The method of claim 16, wherein when the action indicator is between the first threshold and a second threshold greater than the third threshold, the method comprises shortening a length of the predetermined time period to be half the predetermined time period, and when the action indicator is between the second threshold and the third threshold, the method comprises shortening a length of the predetermined time period to be a quarter of the predetermined time period.

* * * * *